United States Patent [19]
Lepist

[11] 4,455,082
[45] Jun. 19, 1984

[54] CROPPING KIT

[76] Inventor: Enn Lepist, Golden Apartments, East Park Rd., Hyde Park, N.Y. 12538

[21] Appl. No.: 415,221

[22] Filed: Sep. 2, 1982

[51] Int. Cl.³ .............................................. G03B 27/62
[52] U.S. Cl. ........................................ 355/75; 355/125
[58] Field of Search ................. 355/75, 125, 126, 113; 40/361–367

[56] References Cited

U.S. PATENT DOCUMENTS

| | | | |
|---|---|---|---|
| 708,770 | 9/1902 | Johnson | 355/126 |
| 1,072,215 | 9/1913 | Druhe | 355/126 |
| 2,720,045 | 10/1955 | Miller | 40/362 |
| 3,194,114 | 7/1965 | Weinberg | 355/75 |

*Primary Examiner*—L. T. Hix
*Assistant Examiner*—Brian W. Brown
*Attorney, Agent, or Firm*—Harvey B. Jacobson

[57] ABSTRACT

Apparatus for cropping and marking the mount of mounted transparencies, the apparatus including a supporting base having a rectangularly-shaped aperture forming a pathway extending from top and bottom through the base, a set of opposite sides having a slideway extending therethrough communicating with the rectangular aperture, a further set of opposite sides having a further slideway extending therethrough communicating with the rectangular aperture, an elongated masking member with a plurality of variously sized openings spaced along its length and being adapted to be received in sliding engagement within the slideway, a transparency holder having at least one transparency holding aperture and adapted to be received in sliding engagement within the further slideway. The apparatus provides use of an adjusting or slidable masking member that eliminates extraneous images from interferring with the selection process and what comes through the cutout is the selected portion thereof. A magnifying glass attachment placed over the rectangular aperture and a removable light source attached to the underside of the rectangular aperture are used with especially dense or low contrast transparencies.

12 Claims, 7 Drawing Figures

CROPPING KIT

BACKGROUND OF THE INVENTION

1. Field of the Invention

Many commercially made enlargements are made on standard sized sheets of 5×7, 8×10, 11×14, and 16×20 inches. In order to indicate with some degree of accuracy the desired portion of a transparency that is desired to be enlarged, it is necessary to make some form of a mask of a selected proportion which is then held against the slide or transparency to find a selected and suitable crop. Once this has been determined, it is desirable to transfer the lines on the crop to the slide or transparency mount. This procedure is often most difficult and certainly frustrating where one has many slides to work with, and when the transfer takes place, it is often a hit and miss process because one is generally holding the mask to the slide surface with fingers which can move out of position or unwanted finger marks can be put on the slide surface which would alter the finally desired product.

2. Description of the Prior Art

The following U.S. patents relate to various photographic techniques and are of interest to the present invention:

U.S. Pat. No. 1,472,640, G. M. Dye
U.S. Pat. No. 2,418,226, R. M. Haff
U.S. Pat. No. 2,534,961, H. Dunn
U.S. Pat. No. 3,194,114, W. L. Weinberg
U.S. Pat. No. 4,252,436, M. Kogane The patent to Dunn discloses a printing mask providing different sized openings used in connection with the printing of pictures through a negative photograph to a sensitized printing paper but requires the use of tape to secure the negative in place. The patent to Weinberg discloses a selective masking assembly used with a manipulating means in a photographic copy apparatus. The patent to Kogane discloses perpendicularly arranged guide members for a negative film and a movable window frame. The other patents disclose a registering frame and negative carrier or photoprinting mask used in photography. None of these patents disclose all of the specific details of the present invention in such a way as to bear upon the patentability of any claims of the present invention.

SUMMARY OF THE INVENTION

An object and advantage of the present invention is to provide a tool for the photographer that assists in the creative process of selecting suitable crop from a total image area in a transparency and to also transfer that information by way of scribed lines to a transparency mount, such as cardboard or plastic, and to permit accurate reproduction via enlargement of that selected area or crop in correct proportion to available photographic printing paper sizes either by the photographer working in his own dark room or by an outside photolab service.

Another object and advantage of the present invention is to provide a kit useful as a tool in cropping 35 mm and 2¼×2¼ inches format mounted transparencies, commonly known as slides, and in which an interchangeable mask cooperates with a support base having a generally rectangular opening passing generally vertically therethrough, and in which mounted transparencies are supporteds in a movable holder. The interchangeable mask or the mounted transparencies in the holder can be adjusted in either of their given directions until a proper selected cropping is achieved.

A further object of the present invention is to provide a photographic tool for the photographer suitable for cropping from a total image area of a transparency and in which the slidable transparency holder or the mask, or both, can be locked by lock screws, and these lock screws can be adjusted to provide a slight drag so that desired precision and selection of the location of a cutout in the mask in relation the transparency can be accomplished as movement is made left or right or up or down over the total image area during selection of a most suitable crop of the transparency. After determination and decision is made that a cutout selected is appropriate and the location of the cutout relative to the transparency is equally suitable, each of the lock screws for the mask and the transparency holder are tightened into a locking position and the cutout is used as a template to mark the transparency mount to indicate the desired crop without manual contact between the fingers and the transparency.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
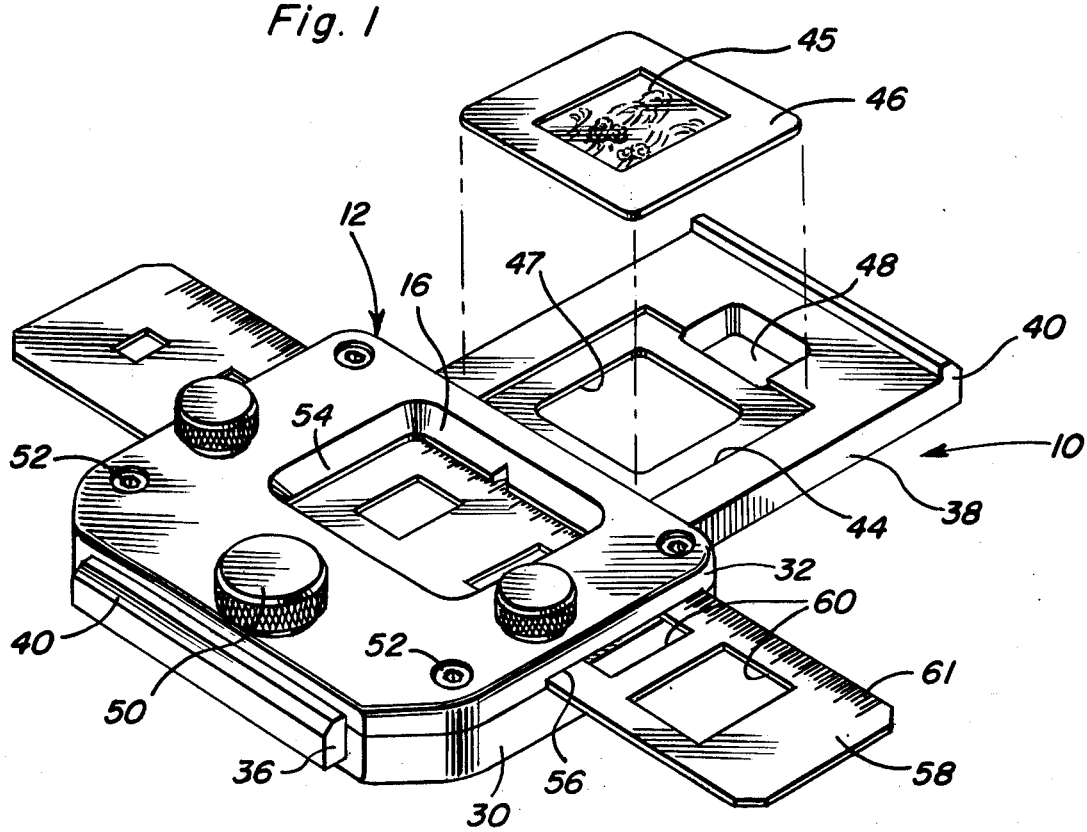
FIG. 1 is a front perspective view of the photographic cropping kit of the present invention.
Figure 2:
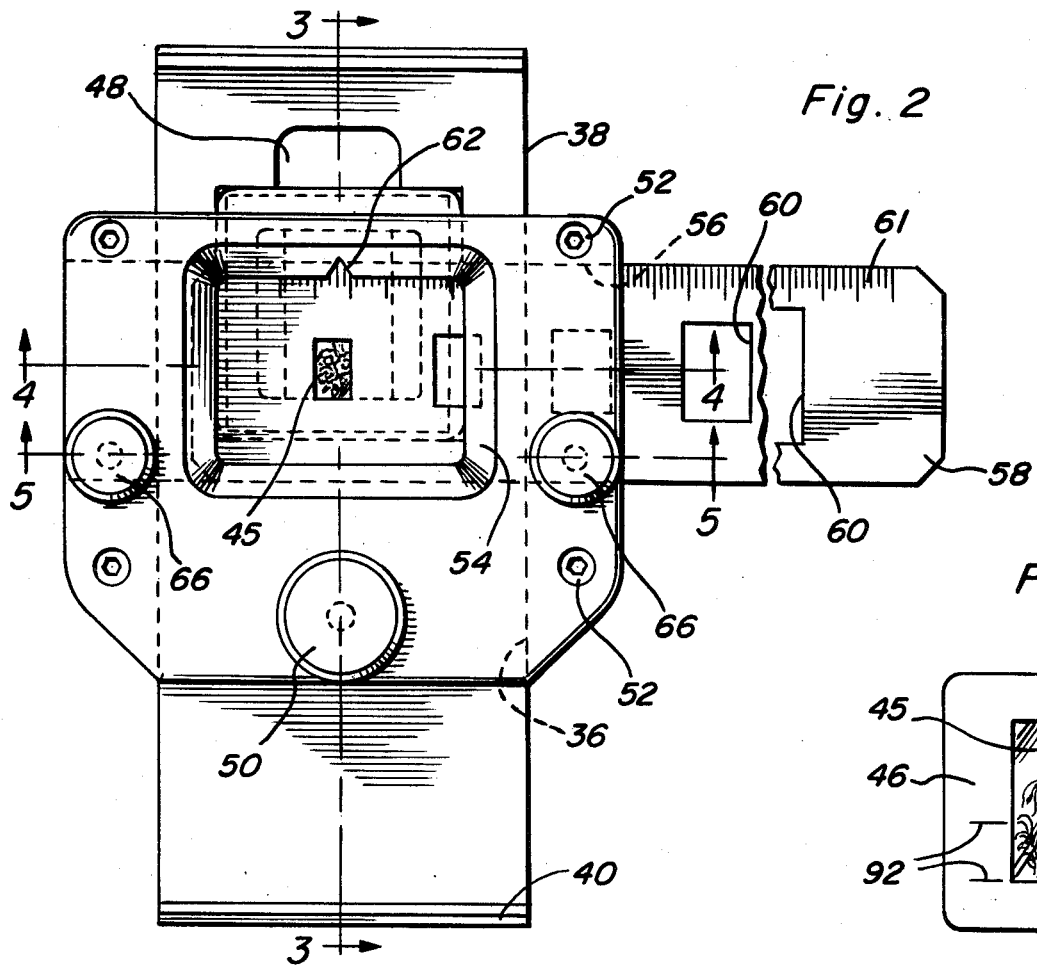
FIG. 2 is a top plan view thereof.
Figure 7:
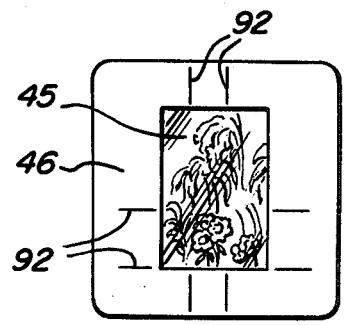
FIG. 7 shows a top plan view of a slide or transparency illustrating marks placed on the mount by using the cropping kit of this invention.
Figure 3:
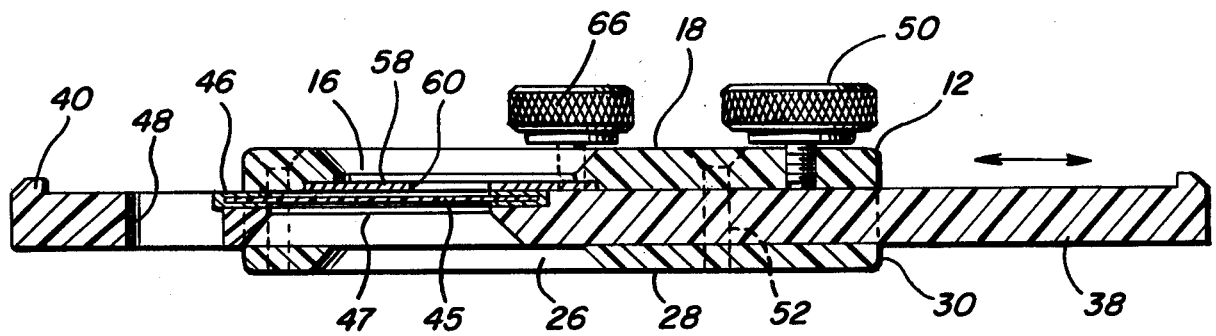
FIG. 3 is a sectional view taken along lines 3—3 of FIG. 2.
Figure 4:
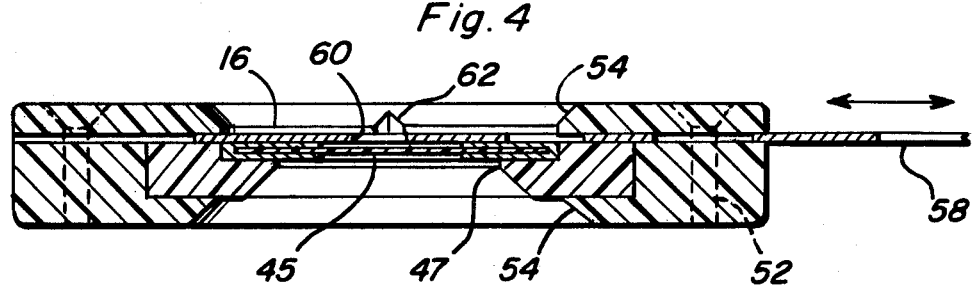
FIG. 4 is a sectional view taken along lines 4—4 of FIG. 2.
Figure 5:
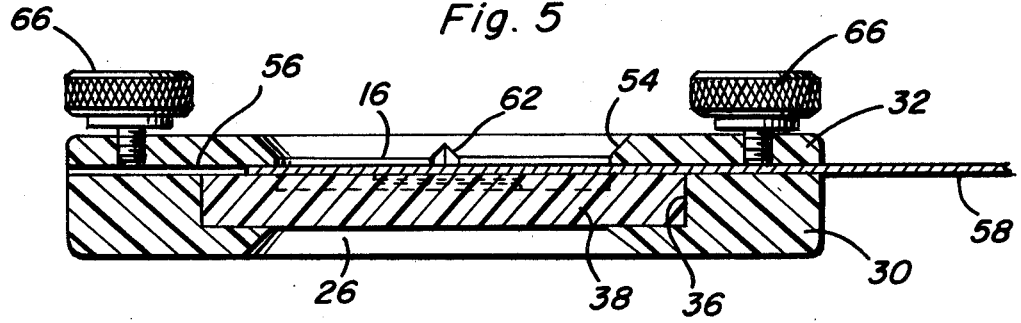
FIG. 5 is a sectional view taken along lines 5—5 of FIG. 2.

Referring now to the drawings, there is shown a cropping kit assembly 10 including a viewer or base support structure 12, a generally rectangularly-shaped aperture or viewing opening 16 in the top surface 18 and a similarly dimensioned rectangularly-shaped aperture or opening 26 in the bottom surface 28 with the openings 16 and 26 being in aligned relation and defined by an inclined peripheral surface oriented at approximately 45° to the surface of the viewer 12. The viewer 12 consists of a base component 30 and a cover component 32. The base component 30 is provided with a recess forming a slideway 36 for receiving a transparency holder 38 that extends through the recess beyond opposite edges of the base component 30. Each end of the holder 38 has an upward projection 40 that locks the holder 38 in slideway 36, limits its movement and forms handles to facilitate manipulative movement of the holder. The slideway 36 communicates directly with the open space formed by apertures 16, 26, and the holder 38 is provided with a cavity or pocket 44 in its upper surface for receiving a transparency 45 and its mount 46 of conventional cardboard or plastic structure, as shown in FIGS. 1 and 7. In order to facilitate removal of the transparency 45 and mount from the pocket 44, a finger receiving recess 48 is provided in the holder 38 for a finger (not shown) to fit under an adjacent edge of the transparency mount 46 so that it can be lifted from the holder 38. The holder 38 includes an opening 47 centered in the pocket 44 and in alignment with the transparency 45 to enable the transparency to be viewed.

A lock screw 50 is threaded through the top component 32 of the viewer 12 and includes a knurled head above the top surface 18 of the viewer for applying frictional drag on the holder 38 as it is manually moved during use and the lock screw 50 can be turned clockwise to firmly secure the holder 38 in position. Assembling the base component 30 with the cover component 32 is done after the film holder 38 is in place and the components 30, 32 are secured in the position and relation as shown by countersunk flat head screws 52 securably fixing the components 30, 32 in a stable and fixed relation. The aperture 16, 26 while generally rectangularly configured, are shown to have a side incline or slope 54 so that light adequately illuminates the the transparency through the aperture 16, 26 without shadows being cast on the transparency 45. By means of the slideway 36, the holder 38 can achieve any desired orientation along a vertical axis of the viewer 12 and the desired vertical orientation can be locked in place by the lock screw 50.

Along an underside of the cover component 32 is a recess forming a slideway 56 for receiving an elongated mask 58 oriented perpendicular to the holder 38, and in which the underside of the mask 58 slides on the top surface of the holder 38. Variously spaced generally centrally along the length of the mask 58 are a plurality of generally rectangular cutouts or openings 60, usually in ascending order or descending order of sizes from one end to another end of the mask 58. The upper edge of the mask 58 is provided with a graduated scale 61 divided into increments of 1/32 of an inch. A V-shaped notch formed in the upper edge of opening 16 provides an index for scale 61 for purposes defined hereinafter. The viewer 12 includes a pair of mask lock screws 66 similar to lock screw 50. When the mask lock screws 66 are relatively loose, the mask 58 slides easily in the lateral or transverse directions, but as one or both of the mask lock screws 66 is tightened, the mask 58 moves against a small bias or frictional drag so that a fixed determination or position of the mask can be achieved in cropping the portion of the image area in transparency 45, and when it is achieved, then both of the mask lock screws 66 are tightened securely.

Figure 6:
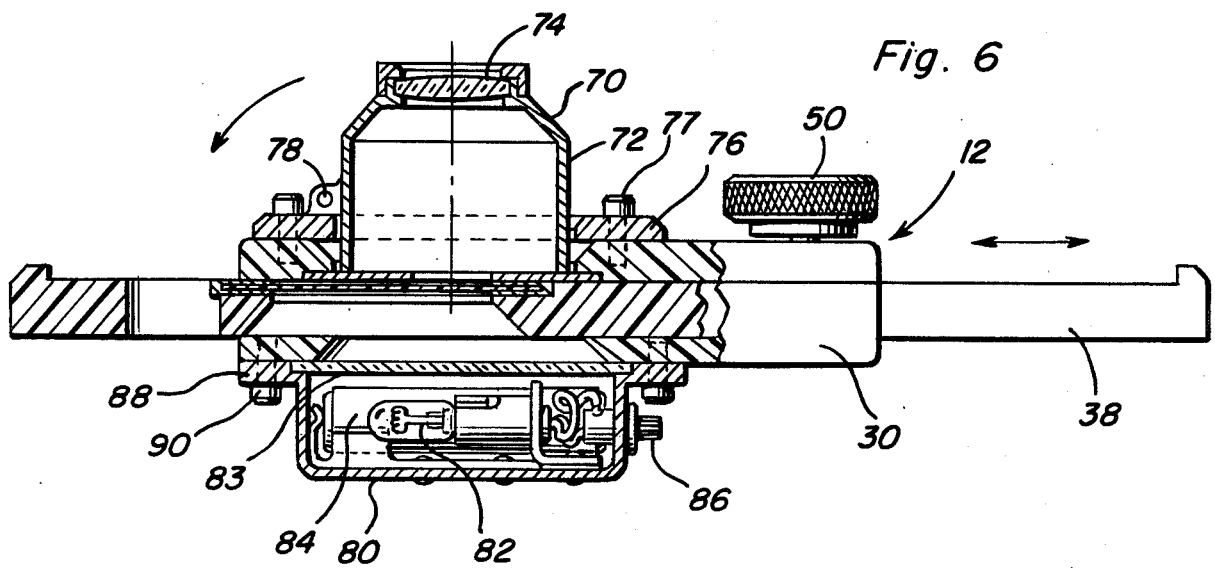
FIG. 6 is a sectional view similar to FIG. 3 and in which a light source and a magnifying glass are attached to the viewer.

FIG. 6 shows a viewer 12 which is provided with a magnifying glass and holder assembly 70 including a housing 72 and a magnifying glass or lens 74 disposed above the viewer. Disposed below the viewer 12 and about the aperture 26, there is a housing 80 for a light bulb 82, a light dispersing translucent panel 83, a battery 84, a pushbutton or turn switch 86 for opening and closing the electrical circuit to the lamp 82 as is done in a well known manner. The housing 70, 80 are easily mounted and removed from the viewer 12 with housing 70 being pivotally supported thereon by a base 76 secured removably to the viewer 12 by fasteners 77 with hinge 78 enabling the housing 70 to pivot out of the opening 16. Likewise, the housing 80 has a base 88 secured to the viewer by fasteners 90.

In use, the photographer determines the most suitable proportion for his reproduction and inserts the appropriate mask into the viewer 12. He then inserts the mounted transparency (slide) into the pocket 44 of the holder 38 and moves the assembly over the image area of the transparency. With the mask screws 66 and the holder lock screw 50 providing slight drag, the photographer selects a suitable cutout 60 in the mask 58 and moves it left or right/ up or down over the total image area and thus selects the most suitable "crop" for his needs. Having made the decision that the cutout 60 he has selected is indeed appropriate and the location of that cutout relative to the transparency is equally suitable, he locks both the mask lock screws 66 and the holder lock screw 50. He is now ready to transfer the information regarding the location of the cutout 60, relative to the image area of the transparency 45, to the cardboard/plastic mount 46 holding the transparency 45. The scale 61 on the mask 58 and the notch 62 at the center of the top edge permits accurate relocation of the mask. Noting the scale reference within the "V" notch, the mask lock screws 66 can now be loosened and the cutout 60 moved first to the left over the cardboard/plastic mount 46 and then to the right, with a fine pointed pencil using the top and bottom edges of the cutout as a template, horizontal parallel lines 92 are scribed or marked onto the left and right sides of the transparency mount 46 as shown in FIG. 7. To accomplish the same thing for the vertical axis, first relocate the mask cutout 60 to the scale reference, noted earlier in the "V" notch 62 and relock mask locking screws 66. Now with the cutout 60 back to its original position, repeat the process on the vertical axis by loosening the viewer lock screw 50 and scribing/marking vertical parallel lines on the top and bottom of the transparency mount 46. With both the horizontal viewer 12 and vertical parallel lines 92, locating the cutout, scribed on the transparency mount, the viewer 12 can now be moved to its lowest position, as shown in FIG. 1, to clear the mounted transparency resting in the pocket 44 in holder 38 thus allowing the mounted transparency to be removed from the cropping device. The cropping device is now ready to repeat the process for the next slide. The choice of mask proportion may differ as will the cutout size, but the basic process of crop selection and marking the transparency mount will be identical. The cropping device is particularly effective in use since the cutout 60 eliminates all extraneous images from interfering with the selection process. All you see is what comes through the cutout 60.

The cropping device is an effective tool for the photographer, to assist in the creative process of selecting a suitable "crop" from the total image area of a transparency and to also transfer that information via scribed lines to the transparency mount (cardboard/plastic) to permit accurate reproduction via enlargement of that selected area or "crop" in correct proportion to available photographic printing paper sizes either by the photographer working in his own darkroom or by an outside photo lab service. The cropping device is designed exclusively for use with 35 mm & 2¼×2¼ format mounted transparencies, more commonly known as "slides" and comes with interchangeable masks 58, each with a number of cutouts 60 graduated in size and in proportion to standard available printing paper sizes, to permit the photographer to select the most suitable size cutout in a particular proportion to facilitate the enlargement he has in mind. For example, each cropping device may be supplied with (3) three interchangeable masks, namely three distinct proportions which are the most frequently requested and yield the basic 5×7, 8×10, and 11×14 proportions from which most other standard sizes are derived. However, square proportions, and a variety of other proportions will be available in other interchangeable masks.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Apparatus for cropping the image area of a photographic transparency comprising a structure having means forming a generally rectangularly-shaped viewing aperture forming a passway extending from top to bottom through the structure, a set of opposite sides of the structure having a first slideway extending therethrough and communicating with the rectangularly-shaped aperture, a further set of opposite sides of the structure having a further slideway extending therethrough and communicating with the rectangularly-shaped aperture, an elongated masking member with a plurality of various sized openings spaced throughout its length and adapted to be received in sliding engagement within the first slideway, the first slideway constraining the masking member for lengthwise movement of the masking member across the rectangularly-shaped aperture in one direction, and an elongated transparency holder having at least one transparency holding aperture and adapted to be received in sliding engagement within the further slideway, the further slideway constraining the the holder for lengthwise movement of the holder across the rectangularly-shaped aperture in a direction perpendicular to said one direction.

2. The invention according to claim 1 wherein mask lock screws secure the masking member in place.

3. The invention according to claim 1 wherein said transparency holding aperture receives a mounted transparency of a 35 mm, or 2¼×2¼ format.

4. The invention according to claim 1 wherein viewer lock screw means are provided to secure the transparency holder in locked relation.

5. The invention according to claim 1 wherein the masking member has a lengthwise scale and the structure includes an index member adjacent the viewing aperture registrable with selected markings on the scale dependent on the position of the masking member in the first slideway.

6. A device for cropping a transparency comprising a transparency holder, a mask having a crop-defining opening therethrough, means supporting the mask in overlying relation to the transparency while constraining the transparency and mask for movement each in a separate direction, the respective directions being mutually perpendicular to each other to enable the opening in the mask to be oriented in registry with a desired portion of the image area of the transparency to define a crop, and indicating means associated with the mask and supporting means to enable the opening to be moved to one edge of the transparency and used as a template to mark the limits of the crop in one dimension on said one edge of the transparency and the opening moved back to exactly the original position with respect to the transparency and thereafter enabling the opening to move to another edge of the transparency in perpendicular relation to said one edge for using the opening as a template to mark the limits of the crop in a second dimension on said another edge of the transparency.

7. The cropping device of claim 6 wherein said supporting means includes a body having perpendicular passageways, said transparency holder including an elongated member having an opening therethrough and means adjacent the opening to retain the transparency in registry with the opening, said holder being slidably received in one of said passageways, said mask being an elongated member slidably received in the other of said passageways in overlying relation to the holder and transparency to enable the opening in the mask to overlie a selected portion of the image area of the transparency to define a two dimensional crop, said body including an opening therethrough to enable observation of the image area of the transparency when orienting the mask opening in crop defining position.

8. The cropping device of claim 7 wherein said indicating means includes a graduated scale along the length of the mask, an index member on said body to indicate the lengthwise relationship of the mask to the body and transparency holder to enable the mask to be moved lengthwise to position the crop defining opening over said one edge of the transparency to enable marks to be made on the transparency to indicate the limits of the crop in one dimension and the mask to be returned to its exact original position.

9. The cropping device of claim 8 wherein said body and transparency holder includes means locking the holder and body in adjusted position after position of the mask opening in selected position to enable lengthwise movement of the mask when marking said one edge of the transparency, and means locking the body and mask in adjusted position to enable movement of the transparency holder in relation to the body and mask in a direction transverse to the mask to enable the crop defining opening to move into registry with said another edge of the transparency to mark the limits of the crop in a second dimension.

10. The cropping device of claim 9 wherein said transparency is provided with a peripheral mount defining the edges on which the crop designating marks are placed to enable the transparency crop to be enlarged.

11. The cropping device of claim 7 wherein said body includes a magnifying device oriented above the body and movable between positions aligned with and out of registry with the opening through the body, and a light on the body in underlying registry to the opening to facilitate observation of the image area of the transparency.

12. The cropping device of claim 7 wherein the mask includes a plurality of different-size crop-defining openings disposed along the length of the mask.

* * * * *